United States Patent [19]

Cushing

[11] Patent Number: 4,620,817
[45] Date of Patent: Nov. 4, 1986

[54] UNDERGROUND DISCHARGE FOR DOWNSPOUTS AND SUMP PUMPS

[76] Inventor: Jerome J. Cushing, 705 N. Western Avenue, Park Ridge, Ill. 60068

[21] Appl. No.: 641,669

[22] Filed: Aug. 17, 1984

[51] Int. Cl.⁴ .................... E02B 11/00; E04D 13/08; E02D 19/00
[52] U.S. Cl. ........................................ 405/43; 405/36; 405/50; 52/16; 52/169.5; 137/357
[58] Field of Search .................. 405/36, 37, 39–41, 405/43–45, 50, 51, 218–220, 229; 52/12, 16, 169.5, 169.1; 137/357; 239/208

[56] References Cited

U.S. PATENT DOCUMENTS

| | | |
|---|---|---|
| 1,433,205 | 10/1922 | Hodges . |
| 1,597,104 | 2/1924 | O'Donnell . |
| 2,077,307 | 10/1935 | Bumpas et al. . |
| 2,768,949 | 10/1956 | Hewey ............................. 405/43 X |
| 2,887,073 | 5/1959 | Thompson ........................ 52/12 X |
| 2,918,077 | 2/1957 | Jack . |
| 3,060,952 | 1/1962 | Bystrom . |
| 3,159,172 | 12/1964 | Baxter .............................. 405/41 X |
| 3,271,913 | 1/1964 | Fields . |
| 3,367,083 | 2/1968 | Woods et al. ..................... 52/16 X |
| 3,501,007 | 3/1970 | Davis ............................... 405/36 X |
| 3,564,854 | 2/1971 | Berthold ........................... 405/50 |
| 4,136,500 | 1/1979 | DiFiore ........................ 52/169.5 X |
| 4,161,186 | 7/1979 | Sitarz ............................... 137/357 |
| 4,285,812 | 8/1981 | Stoltz .............................. 52/12 X |

Primary Examiner—Cornelius J. Husar
Assistant Examiner—Nancy J. Stodola
Attorney, Agent, or Firm—Sughrue, Mion, Zinn, Macpeak and Seas

[57] ABSTRACT

Discharge water from a building, e.g., rainwater discharged from downspouts or groundwater discharged from sump pumps, is carried away from the building in an underground pipe to an aboveground discharge outlet, said discharge operating only when the pipes are full of water and under pressure from the inlet. The underground pipe extends for a substantial distance away from the building and either turns upwardly to the aboveground discharge outlet; or empties into an underground tank which bleeds water downward into the surrounding earth through a porous bottom surface, and communicates water upward through its upper surface with the aboveground outlet.

20 Claims, 14 Drawing Figures

FIG.1 (PRIOR ART)
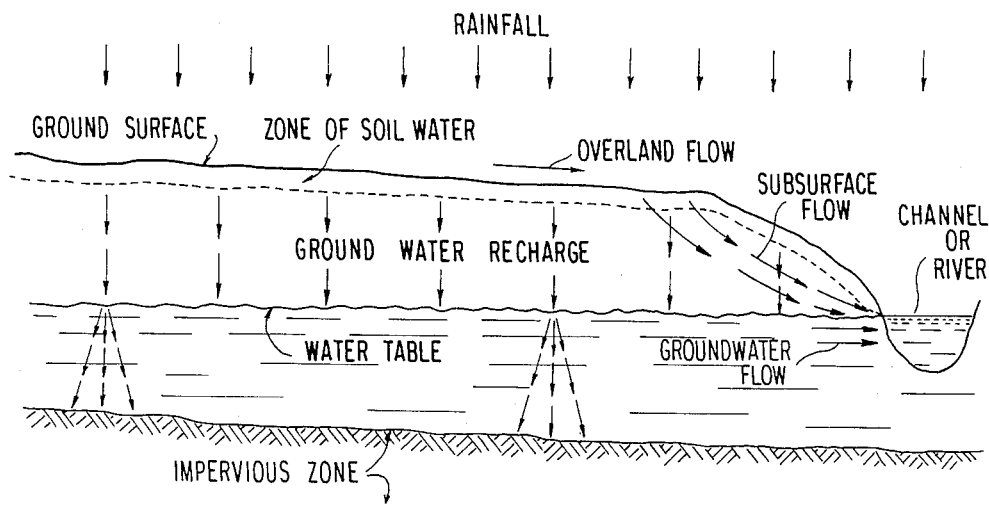
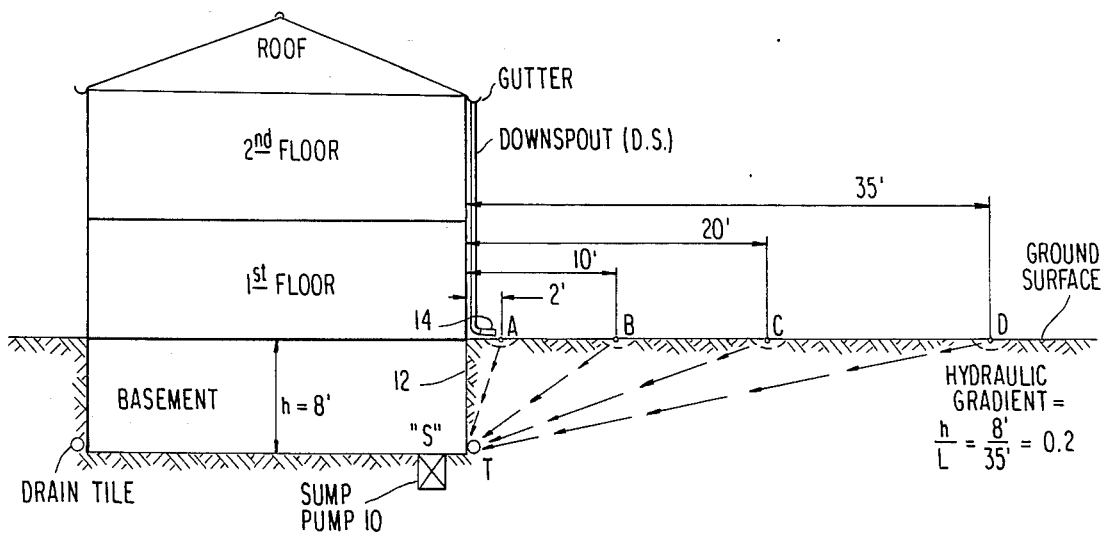
FIG.2 HYDRAULIC GRADIENT
(PRIOR ART)

FIG. 3a
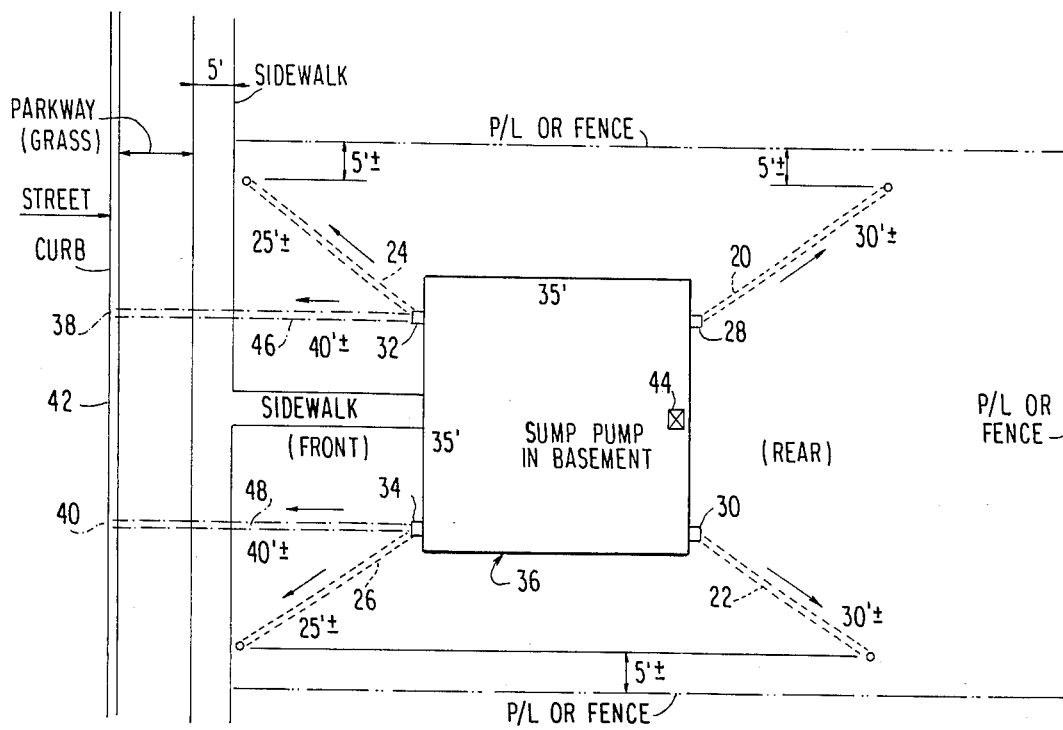
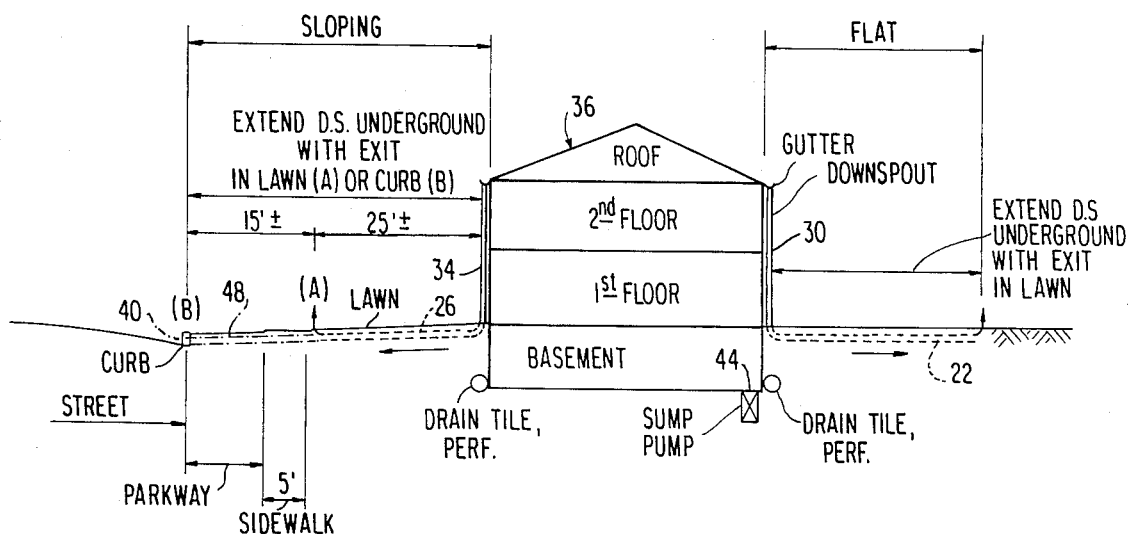
FIG. 3b

FIG. 6
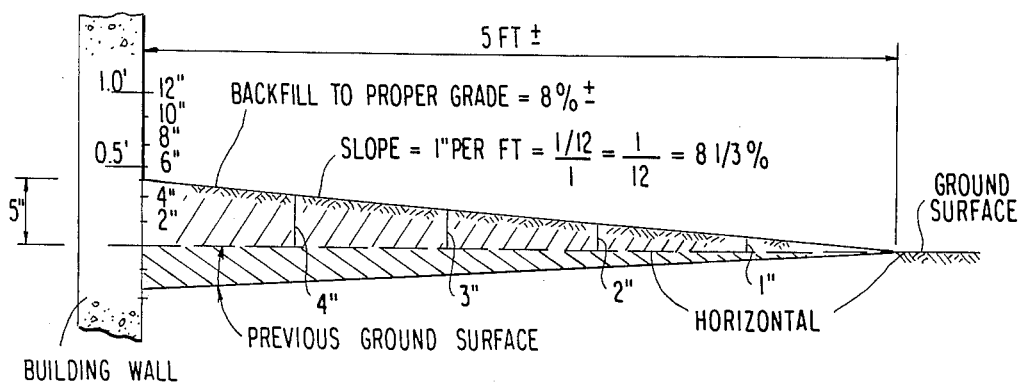
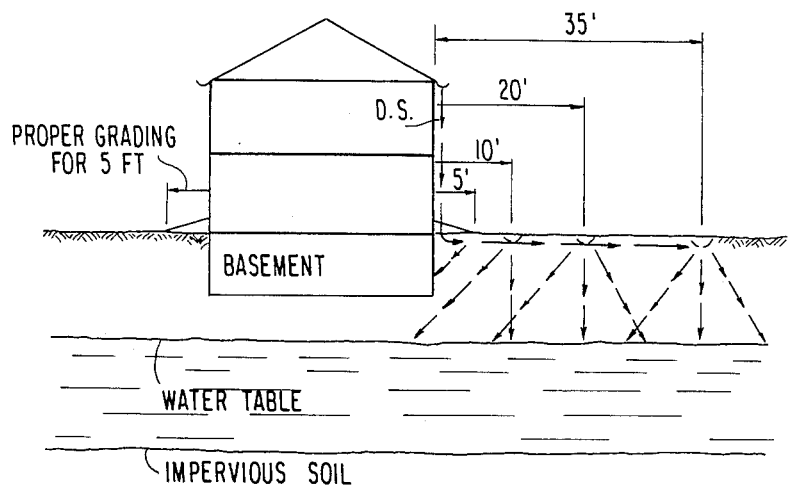
FIG. 7a
BASEMENT ABOVE
WATER TABLE
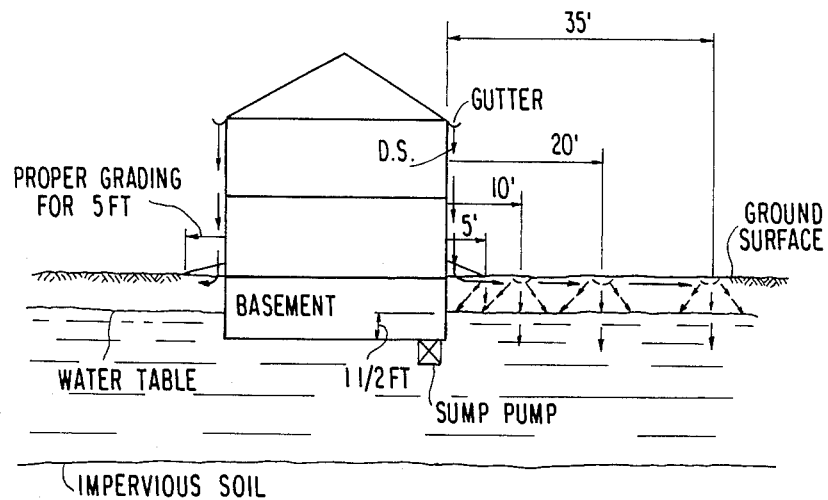
FIG. 7b
BASEMENT BELOW
WATER TABLE

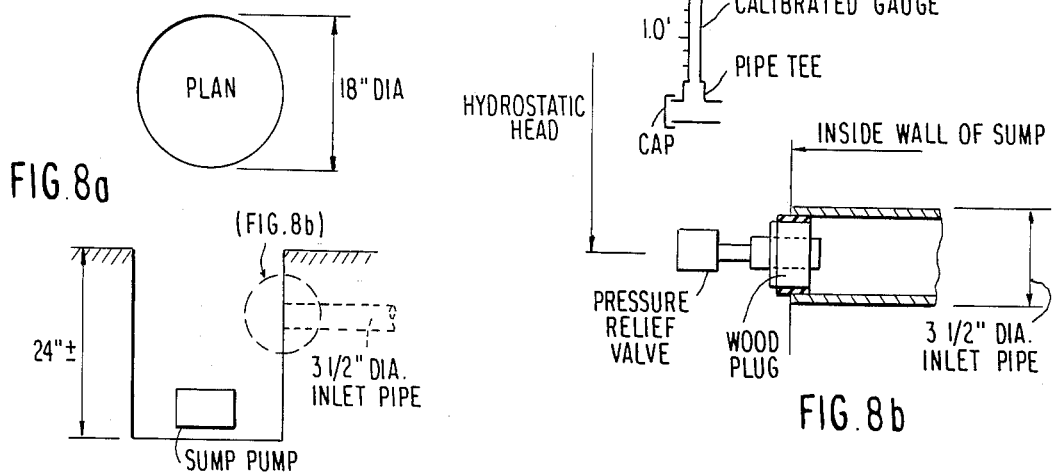
FIG. 8a
FIG. 8b
FIG. 9
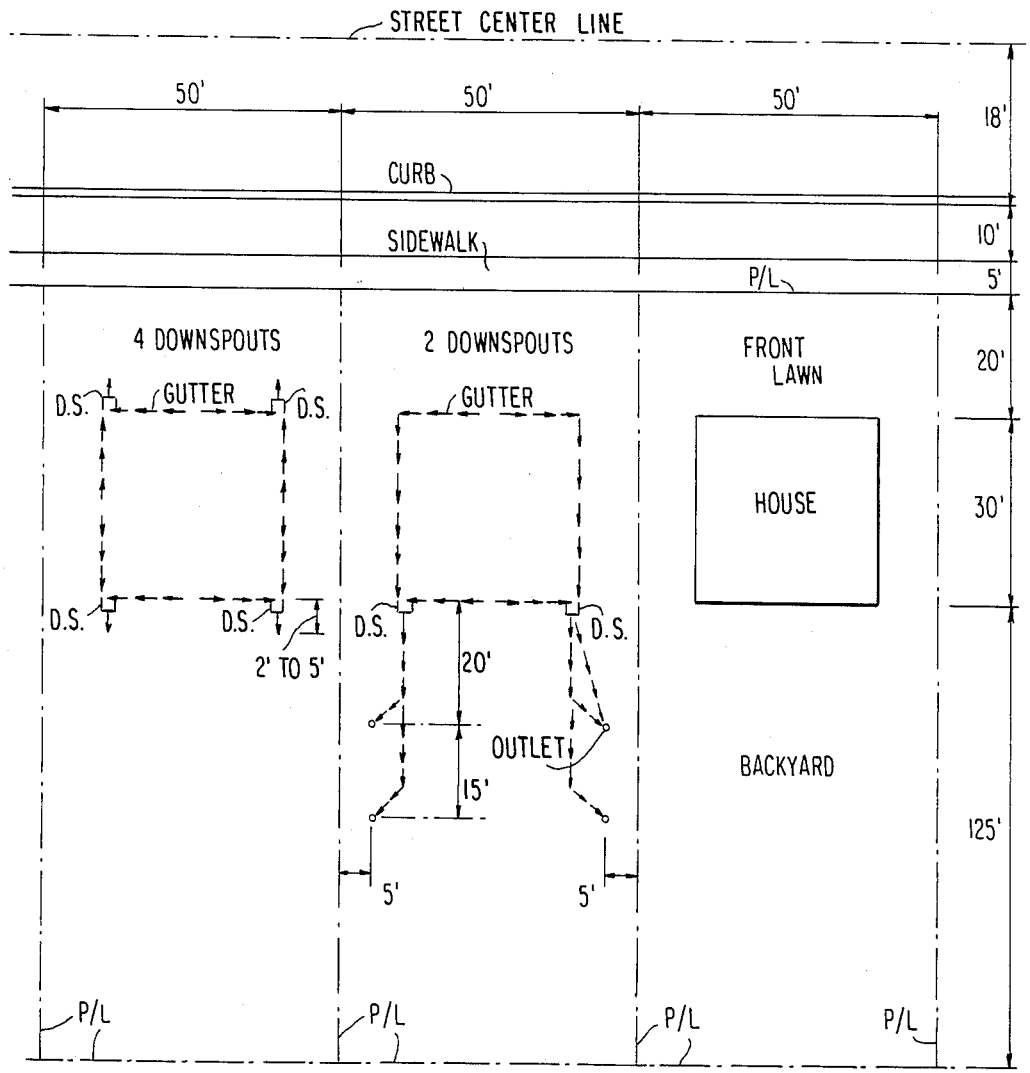

UNDERGROUND DISCHARGE FOR DOWNSPOUTS AND SUMP PUMPS

BACKGROUND OF THE INVENTION

This invention relates to floodproofing basements of homes and buildings, particularly those surrounded by substantially flat grass lawns, and more particularly concerns a technique for discharging rainwater from downspouts or the groundwater discharge from basement sump pumps.

Today, to prevent overloading of combined sewers, building codes and ordinances in most large suburbs (e.g., over 40,000 people) and in many large cities require that the rainwater in downspouts, and groundwater collected in the basement sump, be distributed onto one's own land and property. Such discharges are typically made onto the land within a very short distance from the building, e.g., within five feet. Eventually, such close discharge soon finds its way through the ground back to the basement sump, and pumping starts all over again, i.e., recirculation occurs. To extend downspouts or sump pump discharges a beneficial distance, e.g., 20 to 35 feet, above ground in a pipe across the top of the lawn would be unsightly, and the exposed pipe would be subject to damage from people, lawn mowers, vehicles, etc.

It is therefore an object of the present invention to provide a discharge system which (1) will greatly reduce the rainwater/groundwater inflow into the basement, (2) will eliminate the need for any sump pump for all the houses or buildings whose basements are above the water table, or whose basements are no more than about 1 ½ feet below the water table, (3) will minimize pumping costs, and maximize the life of the sump pump, (4) will overcome the recirculation problem, (5) will do so in an efficient, inexpensive, and aesthetic manner while complying with applicable building codes.

SUMMARY OF THE INVENTION

Briefly, the present invention comprises an underground discharge system which will carry the rainwater discharge from downspouts or the groundwater discharge from basement sump pumps to a beneficial distance from the building, terminating in an aboveground outlet. The underground discharge will be effected by water pressure buildup within the downspout. The invention is useful to relocate the predominant rainwater sources further from the building, and it is especially useful on substantially flat land, i.e., where the ground elevation at the downspout is at substantially the same level as the ground elevation at the outlet. The invention will reduce the rate of flow and total flow toward the basement which (1) will eliminate the need for a sump pump, or (2) when a sump pump is required, will avoid an overloaded sump pump, minimize pumping costs and recirculation problems, and minimize a flooded basement.

In the first embodiment of the invention, the aboveground discharge of a conventional downspout adjacent the building, or the aboveground discharge of a sump pump, would be connected in a watertight, insulated manner to the inlet end of a pipe which would then extend underground a desired distance. The water flowing through the underground pipe would exit through an aboveground discharge at the remote end, preferably at a lever slightly lower than the lever of the connection between the downspout and the outlet. In order to avoid the stagnation or freezing of water within the discharge pipe, the pipe would preferably be inclined downwardly as it extends away from the house, with the remote lower end having perforations for bleeding and discharging water into a granular bedding and into the surrounding earth.

In an alternate embodiment, the underground discharge pipe would terminate in an underground discharge container having an aboveground outlet. The container would preferably have a bottom open to a gravel or stone bedding, or the like, to permit the slow discharge of water accumulated in the container into the ground.

BRIEF DESCRIPTION OF THE DRAWINGS

The invention will be more clearly understood from the following description in conjunction with the accompanying drawings, wherein:

FIG. 1 is an illustration for explaining rainwater and groundwater movement;

FIG. 2 is an illustration of a conventional discharge system close to the building as at point "A";

FIGS. 3a and 3b are plan and elevation views showing the extended underground discharge system of the present invention;

FIG. 6 is an elevation view showing an assumed and appropriate, near-building grading of about 8% which will prevent rainwater pileup too close to the building;

FIGS. 7a and 7b are elevation views illustrating flow nets at buildings whose basements are either above or below the water table;

FIGS. 8a and 8b are views showing a control mechanism in the basement sump to be operative during heavy rainfall when the hydrostatic head adjacent the building is greater than about 1½ feet; and FIG. 9 is a plan view illustrating a proposed use of "fewer" downspouts with their placement at the rear of a house or building, and showing the extended underground discharge system of the present invention.

DETAILED DESCRIPTION OF THE PREFERRED EMBODIMENTS

Figure 4A:
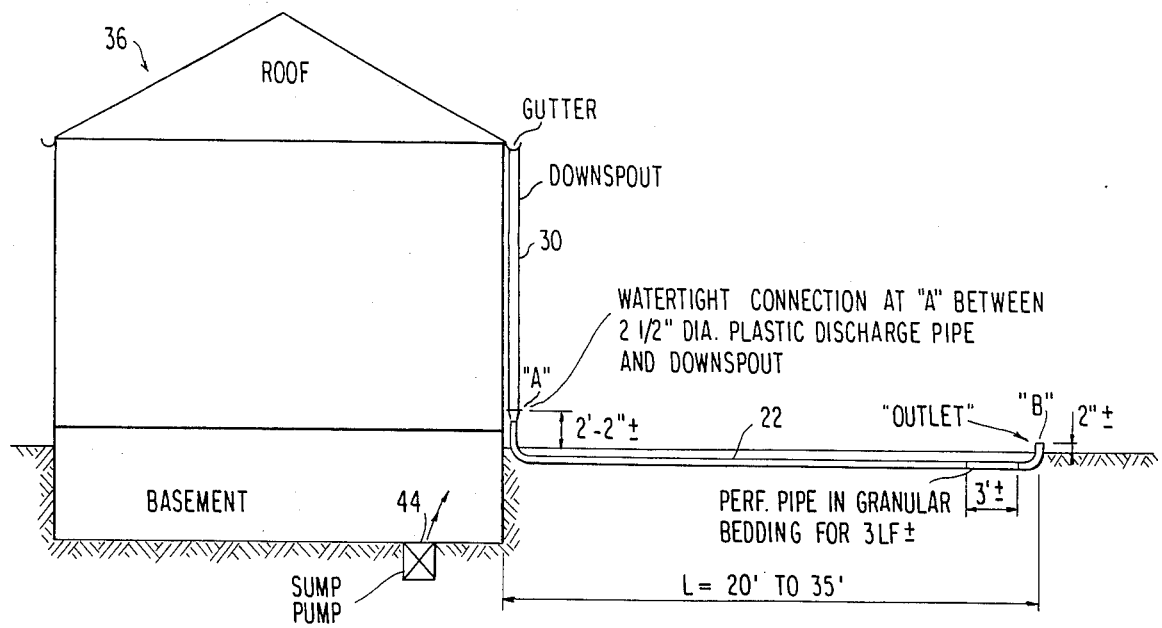
FIGS. 4a and 4b are elevation views showing a first preferred embodiment of the invention employing a pressure discharge.

To provide for a better understanding of the invention, the principles of groundwater movement and their effect on downspout and sump pump discharge will first be discussed.

During rains, the amount of water in the ground increases. During precipitation from rain or snow, the groundwater table is surcharged and recharged from above by rainwater filtering down from the ground surface, as shown in FIG. 1. For typical rainfall in North Illinois, as described in "Lake Evaporation in Illinois", Report Number 57-Illinois State Water Survey-1967, 44% is evaporated from land and water while 25% goes to surface runoff. The remaining 31% goes to groundwater recharge for raising the water table. By way of example, 1.5 inches of rainfall will result in 0.47 inches increase in the water table elevation which will then be carried laterally to the nearest ravine, stream, river, etc. After a rain, the surcharged groundwater will flow through the ground towards the lower elevated basement (FIG. 2). The rate of flow and the total flow depend on the distance of the water source from the basement, or how far the water travels underground to the basement. For example, for a typical configuration as shown in FIG. 2 with a typical aboveground downspout discharge 14 approximately two feet remote from the building wall 12, the water discharged at location A would flow to the basement or to the sump pump 10 with a very steep hydraulic gradient of approximately 4.0, or 20 times faster than if from location D. (The steeper the slope of the hydraulic gradient, the higher is the velocity of flow.) Rainwater at location B ten feet remote from the building wall would flow to the basement or to the sump pump with a less steep hydraulic gradient of approximately 0.8; this means water flows 1/5 as fast or 5 times slower from B than from A (0.8/4.0=1/5). Similarly, water at locations C and D would flow to the basement or to the sump pump with hydraulic gradients of 0.4 (10 times slower) and 0.2 (20 times slower), respectively. The figures given in FIG. 2 assume soil permeability is the same constant value through paths AT, BT, CD and DT.

With the conventional discharge at location A, the discharged water flows relatively quickly to the basement or to the sump pump 10. As the flow goes through the basement cracks or into an underground drain tile encircling the basement, it may either flood the basement or overload the sump pump, if the latter is present. If the sump pump discharge is onto the ground near the building, the water will merely recirculate through the ground and back again to the basement sump pump.

It can be seen from FIG. 2 that the rate of flow from the point of discharge to the basement sump pump would be significantly reduced if the discharge were a greater distance from the building. However, aboveground discharge systems would be unsightly and inconvenient, and would be subject to damage from people, lawn mowers, vehicles, etc.

When (1) rainwater pileup, (2) downspout discharge, or (3) sump pump discharge are adjacent to or near the building, the hydraulic gradient is greatest, and consequently the velocity and quantity of flow toward the basement are greatest, as described with reference to FIG. 2. For example, in a simplified manner, the velocity and flow of water toward the basement or the sump pump from point A in FIG. 2 is twenty times that from point D, i.e., 4.0/0.2=20. Thus, it would be beneficial and useful to relocate the predominant water sources of downspout discharge and sump pump discharge further from the building as a means to reduce the rate of flow and total flow into the basement, thus avoiding or greatly minimizing basement flooding.

As to (1), nominal proper grading of earth slopes adjacent the building would prevent rainwater pileup too close to the building (See FIG. 6). Interior plugging of basement leaks with hydraulic cement would further contribute to floodproofing a basement.

As to (2) and (3), the present invention provides the desired remote discharge through an underground system which will discharge water from downspouts or sump pumps in an aesthetic manner at a beneficial distance from the building rather than in close proximity to the building as is currently done. The rainwater/groundwater discharge is efficiently and economically made onto one's own land and property in conformity with building codes and ordinances in most large suburbs and in many large cities. The latter prohibit discharge of downspouts and/or sump pumps into combined city sewers, so as to prevent overloading of combined sewer systems, i.e., that handle sanitary and storm flow combined.

FIG. 3a is a plan view of one example of a discharge system according to the present invention, showing underground discharge pipes 20 and 22 extending away from the downspouts 28 and 30, respectively, across flat land while discharge pipes 24 and 26 extend away from downspouts 32 and 34 across sloping land. The discharge pipes 20 and 22 are shown as extending across flat land at the rear of the building for a distance of 30 feet from their respective downspouts (while, due to space limitations in the front of the building 36, the discharge pipes 24 and 26 are shown as extending only 25 feet). The discharge pipes 20–26 all end in an aboveground discharge of the rainwater or sump pump discharge within the property lines surrounding the building 36. For sump pump discharge near the building, the sump pump discharge pipe could be extended underground in a similar manner as are the down spouts shown in FIGS. 3a and 3b. Whether the surrounding land is flat or sloping, the underground discharge pipes should slope somewhat downwardly away from the building to facilitate discharge and avoid the stagnation of water within the underground pipes (FIG. 3b).

If local ordinances permit, the discharge pipes, e.g., pipes 24 and 26, could instead extend to front-facing discharge openings 38 and 40 in the curb 42, e.g., for sloping land surfaces. In such a case, it would not be necessary to extend the discharge pipes away from the building at an angle to obtain the maximum discharge distance as is the case of pipes 24 and 26, and the pipes 46 and 48 would preferably extend 35 feet directly to the curb at the nearest point.

Figure 4B:
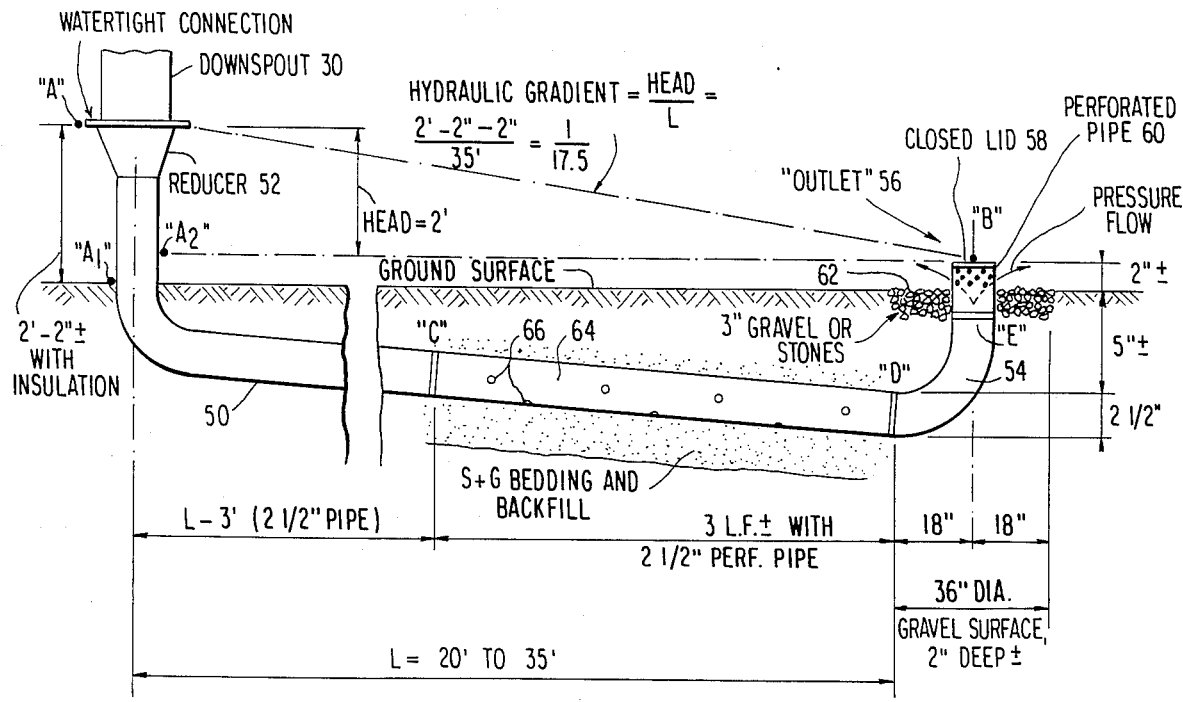

FIGS. 4a and 4b are elevation views showing a pressure discharge system according to the present invention, with FIG. 4b being an enlarged view of the discharge pipe portion of FIG. 4a. As shown most clearly in FIG. 4b, a watertight connection is made at point A between the downspout 30 and a 2½ inch diameter plastic pipe 50 having a reducer 52, if necessary for reducing the size of the downspout 30 to the pipe section 50. The exposed portion of the pipe 50 would preferably be insulated between the downspout 30 and the point $A_1$ at which the pipe 50 enters the ground, to prevent freeze-up. The pipe 50 could be laid in an underground trench 20 to 35 feet long, and then backfilled. The remote end of the discharge pipe 50 would curve upwardly at 54 to an aboveground outlet 56. In a preferred example, the outlet end of the pipe would include a closed lid 58 and a perforated pipe end section 60 extending two inches above ground and surrounded by gravel 62 to a depth of approximately three inches and a diameter of approximately 24 inches. The height above ground of the watertight connection between the downspout 30 and the reducer 52 may beneficially be two feet two inches, thereby providing a pressure head of two feet at the discharge outlet 56 before pressure is applied to the watertight connection at point "$A_2$".

In order to prevent the buildup of slack water in the underground discharge pipe, which may lead to frozen and blocked pipes in the winter, the discharge pipe 50 slopes downwardly away from the building and includes a section 64 having a plurality of perforations 66 and lays in a porous sand and gravel bedding, so that, after the rain has stopped, the pipe will bleed any slack water through the perforations into the sand and gravel bedding. The length of the perforated pipe section 64 may, for example, be approximately three feet.

The curved section 54 of the discharge pipe would preferably be insulated, and the pipe joints at points C, D, and E could be threaded points or stab points for purposes of removal, cleaning and maintenance between points C and B. The outlet 56 could be protected with a domed lid, bush, tree, etc.

While the pressure discharge embodiment of the present invention has been illustrated with respect to downspout discharge, it should be clear that this underground embodiment could similarly be used to extend any sump pump discharge which had otherwise been made near or adjacent the building. In either case, with the discharge pipe extending to the aboveground outlet spaced beneficially 20 to 35 feet from the building, the hydraulic gradient, and consequently the rate of flow of the discharge water back to the basement sump pump, would be substantially reduced, e.g., as indicated with respect to discharge positions C and D in FIG. 2.

Figure 5A:
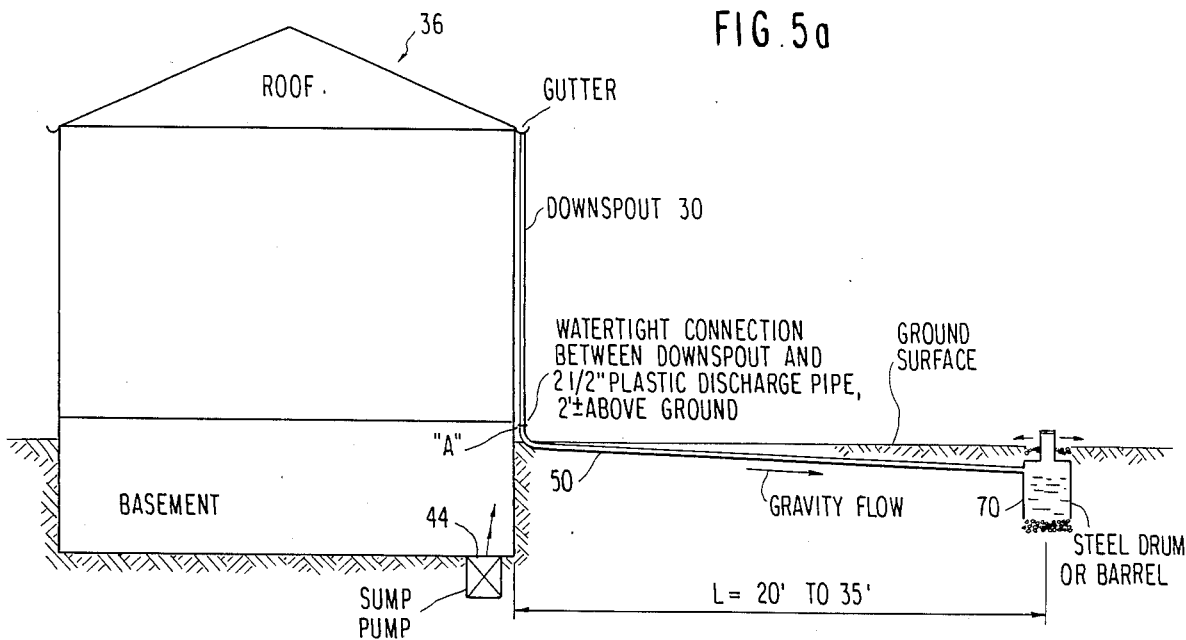
FIGS. 5a and 5b are elevation views showing an alternate preferred embodiment of the invention employing a pressure discharge.
Figure 5B:
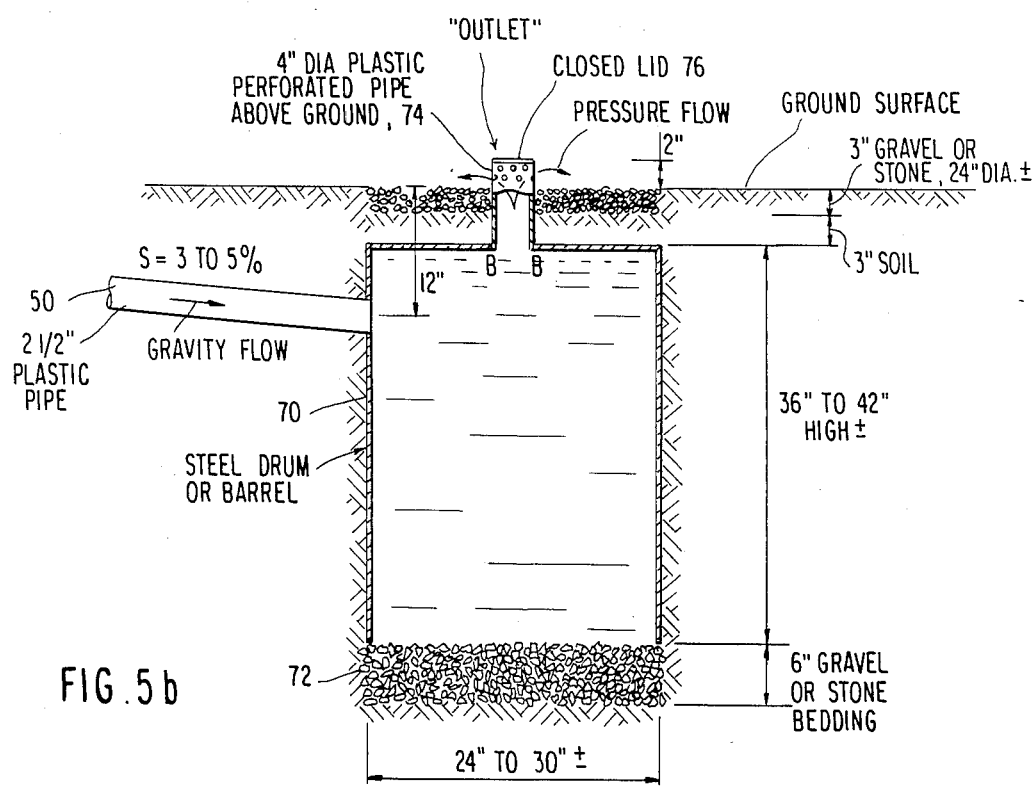

FIGS. 5a and 5b are elevation views and illustrate an alternate embodiment of the present invention using pressure discharge technique, with FIG. 5b providing an enlarged view of the discharge container in FIG. 5a. This embodiment is similar to that of FIGS. 4a and 4b in that a watertight connection is made at point A between the downspout 30 and a 2½ inch diameter plastic pipe 50, having a reducer if necessary. Again the exposed section between point A and the ground surface would be insulated, and the pipe 50 would be laid in an underground trench 20 to 35 feet long and backfilled. As in the previous embodiment, the underground discharge pipe 50 would preferably slope downwardly away from the building, although the slope in this embodiment may be somewhat greater than in the previous embodiment. The downward slope of the underground pipe in the embodiment of FIG. 5a and 5b could be between 3 and 5% depending on the distance from the building to the discharge outlet. For example, the chamber inlet in FIG. 5b is illustrated as being approximately 12 inches below the ground surface. For a discharge location of approximately 20 feet from the building, the downward slope of the underground pipe would be 1 foot/20 feet=5%. For a discharge location L of approximately 35 feet from the building, the downward slope would be approximately 1 foot/35 feet=3%.

The pipe 50 in this embodiment terminates in an empty tank 70, e.g., a 55 gallon drum having its bottom removed and having a height of approximately 36 to 42 inches. shown in more detail in FIG. 5b. With its bottom removed, the barrel is placed on a six inch layer 72 of gravel or stone, which relieves or drains the water from the barrel during or after a rain. A four inch diameter pipe 74 with a closed lid 76 is provided with perforations in its top two inches to permit discharge of the water, the pipe being inserted into the top of the barrel 70. The pipe connection to the top of the barrel at BB could be a threaded joint or a stab joint for purposes of maintenance. For a 24 inch diameter splash surface, a three inch layer of gravel or stone would be placed around the discharge outlet. As in the previous embodiment, the outlet could be protected with a domed lid, bush, tree, etc.

While the embodiment of FIG. 5a and 5b has been described with reference to downspout discharge, it should be clear that this alternate pressure discharge system could be applied as well to extend any sump pump discharge which had otherwise been made near or adjacent the building.

With either embodiment, assumed and nominal grading of earth slopes adjacent the building would prevent rainwater pileup too close to the building; a slope of about 8% to about 5 feet out from the building is recommended, with suitable grading adjacent the building being illustrated in FIG. 6. Interior plugging of basement cracks or leaks with hydraulic cement at walls, joints, or floors would further contribute to floodproofing a basement.

FIGS. 7a and 7b are elevation views illustrating flow nets at buildings whose basements are either above or below the water table. The rainfall on the ground from 0 to 20 feet from the building may fall uniformly and may flow toward the building basement with an average hydraulic gradient equivalent to a 10 foot distance. However, all rainfall on the building and/or discharge from a sump pump will be discharged through the underground discharge system at an aboveground outlet between 20 and 35 feet from the building. The water table in FIGS. 7a and 7b will then be affected as described with reference to FIG. 1. The rainwater/underground discharge system will eliminate the need for any sump pump for all houses or buildings whose basements are above the water table, or whose basements are no more than about 1½ feet below the water table (a typical building wall and basement floor can resist approximately 1½ feet of hydrostatic head of water table, without a sump pump) For the small percentage of houses or buildings whose basements are or will be more than about 1½ feet below the water table and require a sump pump, the underground discharge system with its reduced flow to the basement minimizes costs related to the number of daily pumpages of the sump pump and its maintenance, and maximizes the life of the sump pump.

FIGS. 8a and 8b are views showing a control mechanism with a pressure relief valve in the basement sump. This would be installed in the small percentage of houses or buildings whose basements are or will be more than about 1½ feet below the water table, and require a sump pump (see FIG. 7b). The sump pump would be activated during and after a heavy rainfall (less than 25% of the year) when the hydrostatic head against the outside building wall and the inside basement floor is greater than about 1½ feet. The hydrostatic head above the basement floor or sump could be independently determined by a calibrated gauge as shown in FIG. 8b. In FIG. 8b, reference character 80 designates a wooden plug which may be approximately 1 inch thick and 3 inches in diameter with a ½ to ¾ inch hole in the center and a perimeter rubber gasket. Reference character 81 designates a ½ to ¾ inch pipe flange with an inside thread, reference character 82 designates a ½ to ¾ inch pipe nipple which may be 1 inch-1½ inches long, and reference character 83 designates a 1½ to ¾ inch pressure relief valve set to activate at 1½ feet of hydrostatic head. To determine the hydrostatic head, the pressure relief valve 83 could be removed and pipe tee 84 could be fitted onto the nipple 82 and capped with an end cap 85. A calibrated gage 86, may of plastic, glass or other transparent material, could be fitted to the pipe tee 84.

FIG. 9 is a plan view illustrating a proposed use of "fewer" downspouts with placement at the rear of a house or building, and slowing the extended underground discharge system of the present invention. The lefthand portion of FIG. 9 illustrates a conventional downspout arrangement for a 30 foot by 30 foot building on a 50 by 125 foot lot, with downspouts at each corner of the building and discharging aboveground between 2 and 5 feet from the building. The center portion of FIG. 9 illustrates the improved downspout arrangement of the present invention, with the downspouts being provided with an underground discharge having an aboveground outlet between 20 and 35 feet from the building. With such a discharge arrangement, it is possible to eliminate entirely the downspouts on the front side of the building, with two larger downspouts of 3 inch by 4 inch in rectangular cross-section being provided at each rear corner of the building. The underground discharge could provide an outlet at 20 feet from the building, 35 feet from the building, or each downspout could be directed to two different outlets, one at each distance. With the underground discharge system of the invention which carries the discharge water to a beneficial distance from the building, it is unnecessary to use as many downspouts, since there is no longer a danger that an excessive amount of water carried by any one downspout will result in ponding adjacent or near the building. Aside from fewer downspout/underground connections, it also avoids space limitations at the front of the house as occurred in FIG. 3a. In summary, the underground discharge system of the present invention is advantageous in that:

(1) it is hidden from view, is not unsightly, and is not subject to damage from people, lawn mowers, vehicles etc. The underground piping, by water pressure buildup or by gravity, delivers the water to an aboveground outlet located a beneficial distance of 20 to 35 feet from the building.

(2) it will eliminate the need for any sump pump for all houses or buildings whose basements are above the water table, or whose basements are no more than about 1½ feet below the water table. The rate of flow and total flow of rainwater/groundwater from the outlet back through the ground to the basement is reduced ten to twenty times compared with the prior art. Basement flooding is eliminated.

(3) it will minimize pumping costs, and maximize the life of the sump pump for the relatively small percentage of houses or buildings whose basements are or will be more than about 1½ feet below the water table, and require a sump pump. Basement flooding is minimized.

(4) it is a discharge system that will do the above in an efficient, inexpensive, and aesthetic manner while complying with applicable building codes.

What is claimed is:

1. A discharge system for distributing discharge water (from rains) from a building, said system comprising a discharge pipe having an aboveground inlet adjacent said building, an underground discharge pipe section and a normally-open aboveground outlet located at a desired distance from said building for discharging water from a remote end of said underground discharge pipe section only when said underground discharge pipe section is full, said above ground outlet being normally open in the absence of discharge water pressure at said outlet but only discharging water in response to the pressure of said discharge water in said underground discharge pipe section when water entering said inlet builds up a pressure head higher than the elevation of said outlet, the ground elevation at said outlet being no lower than the ground elevation at said inlet and said underground pipe section having having a plurality of perforations for discharging water into ground surrounding said underground pipe section to avoid stagnant water or freeze up after the discharge from said aboveground outlet has stopped.

2. A discharge system as defined in claim 1, wherein said underground discharge pipe slopes downwardly away from said building.

3. A discharge system as defined in claim 2, wherein the distance between said underground discharge pipe and the ground surface increases with distance from said building.

4. A discharge system as defined in claim 2, wherein said underground discharge pipe, due to its downward slope away from said building, includes a section of lowest elevation, said lowest elevation section including said plurality of perforations.

5. A discharge system as defined in claim 4, wherein said discharge pipe, at a location downstream from said at least one perforation, extends upwardly to with said aboveground outlet.

6. A discharge system as defined in claim 1, wherein said aboveground outlet comprises an aboveground section of perforated pipe having horizontally perforations for discharging pressurized water above ground.

7. A discharge system as defined in claim 1, wherein said building includes a basement, and said distance of the aboveground outlet from said building is substantially within the range of 20 to 35 feet, to substantially reduce rainwater/groundwater flow to said basement and minimize basement flooding.

8. A discharge system as defined in claim 1, further comprising underground discharge means having an underground discharge outlet at a remote end of said underground discharge pipe for discharging water from said underground discharge pipe into the ground surrounding said underground discharge pipe.

9. A discharge system as defined in claim 8, wherein said underground discharge means comprises:
an underground chamber having an inlet for communicating with said underground discharge pipe,
an underground outlet at a level below said inlet, and
said above ground outlet at a level above said inlet for discharging water, only when said underground discharge pipe section is full, in response to the pressure of said discharge water in said underground pipe section when water entering said inlet builds up a pressure head higher than the elevation of said outlet.

10. A discharge system a defined in claim 9, wherein said underground chamber comprises an open-bottomed tank having a substantially non-porous sidewall and upper roof, an open bottom, said chamber inlet in said side wall communicating with said underground discharge pipe section, and said upper roof having an aperture therein for communicating vertically with said aboveground discharge outlet.

11. A discharge system as defined in claim 8, wherein said underground pipe slopes downwardly away from said building.

12. A discharge system as defined in claim 11, wherein said desired distance is substantially within the range of 20 to 35 feet.

13. A discharge system as defined in claim 1, further comprising insulating means for insulating said discharge system against freezing.

14. A discharge system as defined in claim 1, further comprising detection means for monitoring the hydrostatic head against said building, a sump pump for pumping water out of said building as discharge water, and means for activating said sump pump when said hydrostatic head exceeds a predetermined height.

15. A discharge system as defined in claim 1, wherein said aboveground outlet is removable to enable maintenance or cleanout of dirt, debris or the like from said underground discharge pipe section.

16. A discharge system as defined in claim 2, further comprising underground discharge means having an underground discharge outlet at a remote end of said underground discharge pipe.

17. A discharge system as defined in claim 3, further comprising underground discharge means having an underground discharge outlet at a remote end of said underground discharge pipe.

18. A discharge system as defined in claim 4, wherein said aboveground outlet is removable to enable maintenance or cleanout of dirt, debris, or the like, which may move to said lowest elevation section of said underground discharge pipe.

19. A discharge system as defined in claim 1, further comprising a porous bed of granular material beneath said plurality of perforations for effectively draining water discharged through said perforations into surrounding subsurface.

20. A discharge system as defined in claim 1, wherein said underground pipe section includes a downwardly sloping portion and said plurality of perforations are formed in said downwardly sloping portion.

* * * * *